United States Patent
Fortin et al.

(10) Patent No.: US 9,956,478 B2
(45) Date of Patent: May 1, 2018

(54) PROGRAM, RECORDING MEDIUM, INFORMATION PROCESSING APPARATUS, AND CONTROL METHOD

(71) Applicant: SQUARE ENIX HOLDINGS CO., LTD., Tokyo (JP)

(72) Inventors: Jean-François F Fortin, Montreal (CA); Alex Tait, Montreal (CA); Cyril Perrin, Antony (FR)

(73) Assignees: SQUARE ENIX HOLDINGS CO., LTD, Tokyo (JP); EIDOS INTERACTIVE CORPORATION, Montreal, Quebec (CA)

( * ) Notice: Subject to any disclaimer, the term of this patent is extended or adjusted under 35 U.S.C. 154(b) by 7 days.

(21) Appl. No.: 15/037,182

(22) PCT Filed: Dec. 1, 2014

(86) PCT No.: PCT/JP2014/082347
§ 371 (c)(1),
(2) Date: May 17, 2016

(87) PCT Pub. No.: WO2015/083837
PCT Pub. Date: Jun. 11, 2015

(65) Prior Publication Data
US 2016/0287985 A1 Oct. 6, 2016

Related U.S. Application Data

(60) Provisional application No. 61/912,608, filed on Dec. 6, 2013.

(51) Int. Cl.
*A63F 13/12* (2006.01)
*A63F 13/22* (2014.01)
(Continued)

(52) U.S. Cl.
CPC .............. *A63F 13/22* (2014.09); *A63F 13/35* (2014.09); *A63F 13/355* (2014.09); *A63F 13/42* (2014.09); *A63F 13/79* (2014.09)

(58) Field of Classification Search
CPC ...................................................... A63F 13/12
See application file for complete search history.

(56) References Cited

U.S. PATENT DOCUMENTS

| 6,727,884 B1 | 4/2004 | Leatham et al. |
| 6,965,368 B1 | 11/2005 | Andrews et al. |

(Continued)

FOREIGN PATENT DOCUMENTS

| JP | 8-44518 | 2/1996 |
| JP | 2001-038050 | 2/2001 |

OTHER PUBLICATIONS

Supplementary Partial European Search Report from European Patent Office (EPO) in European Patent Appl. No. 14866878.3, dated Jun. 26, 2017.

(Continued)

*Primary Examiner* — Omkar Deodhar
(74) *Attorney, Agent, or Firm* — Greenblum & Bernstein, P.L.C.

(57) ABSTRACT

Upon receiving first operation information indicating a first operation member to which an operation input has been made, an information processing apparatus changes, based on correspondence information, the first operation information to second operation information indicating a second operation member associated with the first operation member indicated by the first operation information and outputs the second operation information to the processing for the game.

14 Claims, 6 Drawing Sheets

(51) Int. Cl.
 *A63F 13/42* (2014.01)
 *A63F 13/35* (2014.01)
 *A63F 13/79* (2014.01)
 *A63F 13/355* (2014.01)

(56) References Cited

U.S. PATENT DOCUMENTS

| | | |
|---|---|---|
| 7,116,310 B1 | 10/2006 | Evans et al. |
| 2005/0225530 A1 | 10/2005 | Evans et al. |
| 2011/0086706 A1 | 4/2011 | Zalewski |
| 2013/0059660 A1 | 3/2013 | Zalewski |
| 2013/0159375 A1 | 6/2013 | Perry |
| 2013/0274018 A1 | 10/2013 | Zalewski |
| 2016/0328214 A1 | 11/2016 | Perry et al. |

OTHER PUBLICATIONS

International Search Report (ISR) from International Searching Authority (Japan Patent Office) in International Pat. Appl. No. PCT/JP2014/082347, dated Mar. 3, 2015.

F I G. 1
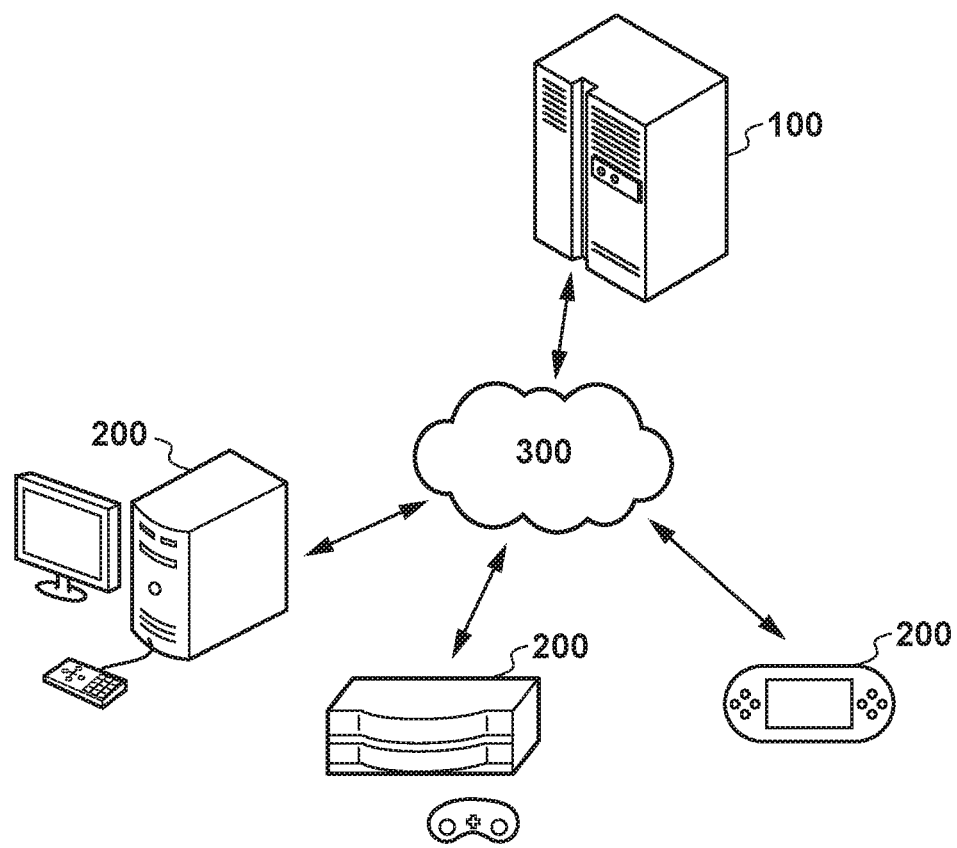

F I G. 4

CORRESPONDENCE INFORMATION FOR USER ID: XXXXXX

GENRE ID:XXXXXX

| ACTION | USER-SPECIFIED OPERATION MEMBERS | GAME-SPECIFIED OPERATION MEMBERS | | |
|---|---|---|---|---|
| | | GAME ID:A | GAME ID:B | GAME ID:C |
| CHARACTER MOVEMENT | AnalogStickL | AnalogStickL | AnalogStickL | AnalogStickL+L1/R1 |
| CAMERA MOVEMENT | AnalogStickR | AnalogStickR | AnalogStickR | – (FIXED) |
| FORWARD DIRECTION OF ROTATION OF CAMERA | X-LEFT, Y-DOWN | X-LEFT, Y-DOWN | X-RIGHT, Y-UP | – (FIXED) |
| ARMED ATTACK | R1 | □ | R1 | □+R1 |
| DEFENSE | □ | L1 | □ | △ |
| AVOIDANCE | AnalogStickL+× | – | AnalogStickL+△+○ | AnalogStickL+× |
| ITEM SELECTION | LEFT/RIGHT | △ | LEFT/RIGHT | START+UP/DOWN |
| RUNNING | L2+AnalogStickL | R1+AnalogStickL | L3+AnalogStickL | ○+AnalogStickL |
| THROWING | R2 | R1 | R1 | □+R1 |
| AIMING | L1+AnalogStickR | △+AnalogStickR | R1+AnalogStickL | L1/R1 |
| DETERMINATION | ○ | ○ | ○ | □ |
| CANCELLATION | × | × | △ | × |

401

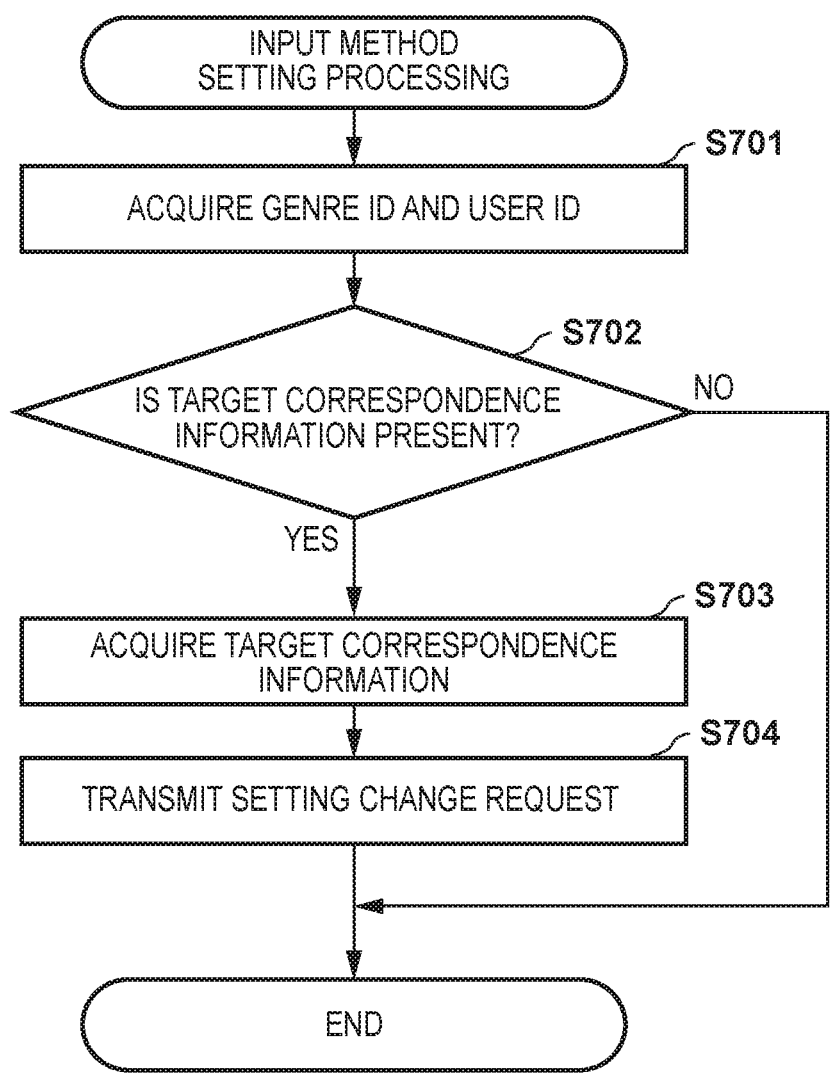

PROGRAM, RECORDING MEDIUM, INFORMATION PROCESSING APPARATUS, AND CONTROL METHOD

CLAIM FOR PRIORITY

This application is a U.S. National Stage of PCT/JP2014/082347 filed on Dec. 1, 2014, and claims the priority benefit of U.S. provisional application 61/912,608, filed Dec. 6, 2013, the contents of which is expressly incorporated by reference herein in their entireties.

TECHNICAL FIELD

The present invention relates to a program, a recording medium, an information processing apparatus, and a control method, and particularly to a technique for simplifying a user operation input for a game.

BACKGROUND ART

Users can play games by using hardware such as a home game console and a PC. With such a device, the user can cause an action for a game, including, for example, a character operation within the game, by making an operation input via an operation input interface and an input device including a finite number of buttons or keys (operation members) such as a gamepad, a keyboard, and a mouse.

At present, various games have been released, and the operation input method using the above-described operation input interface is set for each of the games. In other words, the user needs to memorize or learn an operation input method pre-defined by the developer of each game in order to cause a predetermined action in the game that the user plays. In this respect, Japanese Patent Laid-Open No H08-044518 discloses a technique for integrating the operations of application software for which different operation input methods are provided, thus facilitating the use of the software.

Japanese Patent Laid-Open No. H08-044518 describes a conceptual method that enables an operation input method for a general operation such as cursor movement to be used by other applications. However, in general, a general-purpose operation input interface that is used to play a game only includes a limited number of operation members such as buttons and an analog stick, as described above. More specifically, for any game genre, in general, a plurality of actions that can be used under the same situation within a game are distributed to such a limited number of operation members or assigned to a combination thereof so as to prevent these operations from being assigned to the same operation member. That is, with an operation input interface that can only use a limited number of inputs, the actions that the user can use for each game are limited inevitably or in consideration of the user operability. In particular, an action common to game applications, for example, games of different game genres, is not necessarily present, and therefore, the method described in Japanese Patent Laid-Open No. H08-044518 has not been applicable. For example, even for a character moving operation, an operation member used for a suitable operation input varies depending on whether a screen for a game represents the game world two-dimensionally or three-dimensionally. Thus, there has been the possibility that the use of the method disclosed in the Japanese Patent Laid-Open No. H08-044518 may force a complicated operation input method on the user.

In addition, there are various game genres such as action, RPG (Role-Playing Game), and FPS (First Person Shooting), and the games of each genre are released by a plurality of developers or publishers. On the other hand, the games of the same game genre may have similar actions that can be used by the users for an operated character, even though they are provided by different developers. For example, the operation input method for the games of the action genre is configured to cause an operated character to perform basic actions in the genre, including running, jumping, attacking, and rolling, etc. For example, the operation input method of the games for the FPS genre is configured to cause an operated character to perform basic actions for the genre, including running, jumping, aiming, shooting, fighting, and throwing, etc.

However, even for a basic action used in common for the games of the same game genre, the operation member to which the action is assigned may vary from one developer to another. This difference in the assigned operation member may cause a problem, for example, when a user who is accustomed to playing a given game plays a game that is of the same game genre but is provided by a different developer. More specifically, since the games of the same game genre may be similar, the user may perform an operation input to which the user is accustomed in a situation where an instant operation of the user is required, for example. Consequently, there is the possibility that an operation that is different from the action intended by the user may occur in the game. Such an occurrence of a different action may lead to a result that may be disadvantageous to the user (e.g., the game is over), thus possibly reducing the user's interest in the game.

SUMMARY OF INVENTION

The present invention was made in view of such problems in the conventional technique. The present invention provides a program, a recording medium, an information processing apparatus, and a control method that simplify an operation input for an action desired by the user in game play.

The present invention in its first aspect provides a program that causes a computer connected to an execution means for executing processing for a game to execute: a process of acquiring information indicating a genre of a game for which processing is executed by the execution means; a process of acquiring correspondence information indicating correspondence between information on a first operation member that is pre defined to accept an operation input for an action provided for a game of the same genre as a genre of the game for which the processing is executed and information on a second operation member that is pre-defined to accept an operation input for the action in the executed processing for the game; a process of receiving first operation information indicating the first operation member to which an operation input has been made; and a process of changing, based on the correspondence information, the first operation information to second operation information indicating the second operation member associated with the first operation member indicated by the first operation information and outputting the second operation information to the execution means.

The present invention in its second aspect provides a program that causes a computer connected to an execution means for executing processing for a game to execute: a process of acquiring information indicating a genre of a game for which processing is executed by the execution means; a process of acquiring correspondence information indicating correspondence between information on a first operation member that is pre-defined to accept an operation input for an action provided for a game of the same genre as a genre of the game for which the processing is executed and information on a second operation member that is pre-defined to accept an operation input for the action in the executed processing for the game; and a process of causing the execution means to change a setting of the executed processing for the game such that an action based on an operation input accepted by the second operation member is accepted as an operation input to the first operation member associated with the action in the correspondence information.

The present invention in its third aspect provides an information processing apparatus connected to an execution means for executing processing for a game, comprising: a first acquisition means for acquiring information indicating a genre of a game for which processing is executed by the execution means; a second acquisition means for acquiring correspondence information indicating correspondence between information on a first operation member that is pre-defined to accept an operation input for an action provided for a game of the same genre as a genre acquired by the first acquisition means and information on a second operation member that is pre-defined to accept an operation input for the action in the executed processing for the game; a reception means for receiving first operation information indicating the first operation member to which an operation input has been made; and an output means for changing, based on the correspondence information acquired by the second acquisition means, the first operation information to second operation information indicating the second operation member associated with the first operation member indicated by the first operation information and outputting the second operation information to the execution means.

The present invention in its fourth aspect provides an information processing apparatus connected to an execution means for executing processing for a game, comprising: a first acquisition means for acquiring information indicating a genre of a game for which processing is executed by the execution means; a second acquisition means for acquiring correspondence information indicating correspondence between information on a first operation member that is pre-defined to accept an operation input for an action provided for a game of the same genre as a genre acquired by the first acquisition means and information on a second operation member that is pre-defined to accept an operation input for the action in the executed processing for the game; and a changing means for causing the execution means to change a setting of the executed processing for the game such that an action based on an operation input accepted by the second operation member, is accepted as an operation input to the first operation member associated with the action in the correspondence information acquired by the second acquisition means.

The present invention in its fifth aspect provides a control method for an information processing apparatus connected to an execution means for executing processing for a game, comprising: a first acquisition step of acquiring information indicating a genre of a game for which processing is executed by the execution means; a second acquisition step of acquiring correspondence information indicating correspondence between information on a first operation member that is pre-defined to accept an operation input for an action provided for a game of the same genre as a genre acquired in the first acquisition step and information on a second operation member that is pre-defined to accept an operation input for the action in the executed processing for the game; a reception step of receiving first operation information indicating the first operation member to which an operation input has been made; and an output step of changing, based on the correspondence information acquired in the second acquisition step, the first operation information to second operation information indicating the second operation member associated with the first operation member indicated by the first operation information and outputting the second operation information to the execution means.

The present invention in its sixth aspect provides a control method for an information processing apparatus connected to an execution means for executing processing for a game, comprising: a first acquisition step of acquiring information indicating a genre of a game for which processing is executed by the execution means; a second acquisition step of acquiring correspondence information indicating correspondence between information on a first operation member that is pre-defined to accept an operation input for an action provided for a game of the same genre as a genre acquired in the first acquisition step and information on a second operation member that is pre-defined to accept an operation input for the action in the executed processing for the game; and a changing step of causing the execution means to change a setting of the executed processing for the game such that an action based on an operation input accepted by the second operation member is accepted by an operation input to the first operation member associated with the action in the correspondence information acquired in the second acquisition step.

Further features of the present invention will become apparent from the following description of exemplary embodiments (with reference to the attached drawings).

BRIEF DESCRIPTION OF DRAWINGS

FIG. 1 is a diagram illustrating a system configuration of a cloud game system according to embodiments and variations of the present invention.

FIG. 4 is a diagram showing an example or correspondence information according to embodiments and variations of the present invention.

FIG. 7 is a flowchart illustrating input method setting processing executed by the input control unit 110 according to Embodiment 2 of the present invention.

DESCRIPTION OF EMBODIMENTS

Embodiment 1

Figure 2:
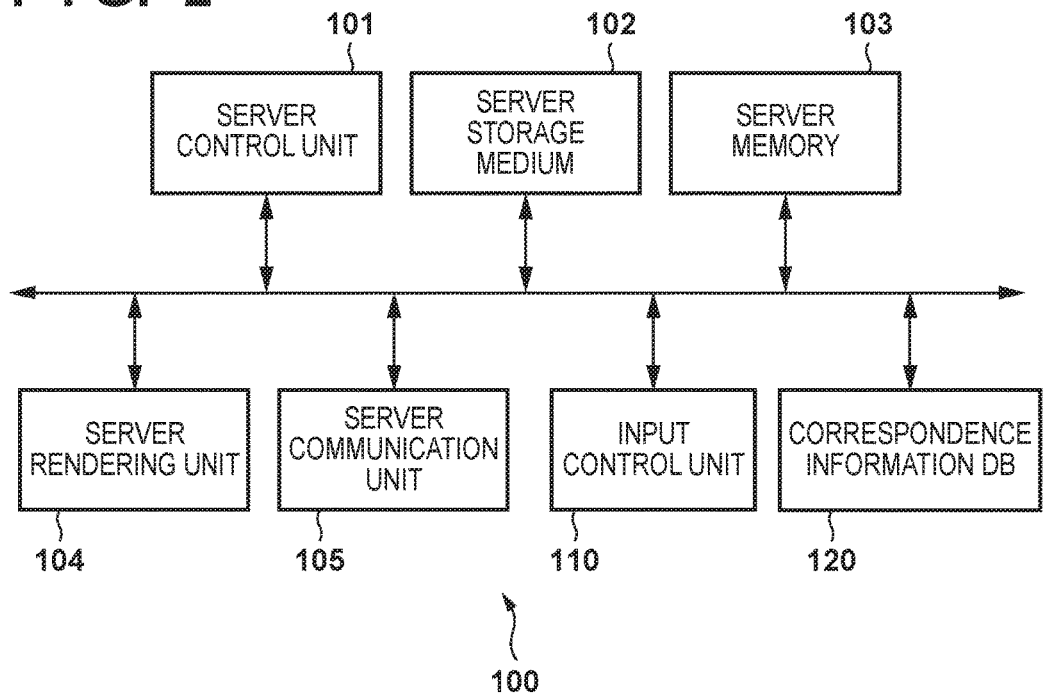
FIG. 2 is a diagram illustrating a functional configuration of a server 100 according to embodiments and variations of the present invention.

Preferred embodiments of the present invention will now be described in detail with reference to the accompanying drawings. Note that the following embodiment describes a case where the present invention is applied to, as an exemplary information processing apparatus, the so-called cloud game system that enables a game experience via a network at a client, terminal used by the user. However, the present invention is applicable to any device capable of connecting to an apparatus that executes processing for a game.

Configuration of Game System

FIG. 1 is a diagram showing a system configuration of a game system according to an embodiment of the present invention.

As shown in FIG. 1, in the game system of the present embodiment, the user who wishes to engage in game play can use a game service provided by a server 100 by connecting a client apparatus 200 to the server 100 via a network 300 such as the Internet. For example, in the case of using the service, the user logs into the service by using a unique user ID. Then, the user selects the desired game content, and makes a provision request for the content. Thereby, the user can engage in game play of that content. In the game system of the present embodiment, the server 100 includes programs for the game content of various game genres, and executes processing for a game corresponding to the content selected by the user. The execution of the processing for a game includes processing for rendering a game screen for the game. In the present embodiment, the server 100 executes the processing for rendering the game screen, and sends the game screen via the network 300 to the client apparatus 200 that has made the provision request. The provision of the game screen may be performed by sending frames of a moving image stream. With such a cloud game system, the user can engage in game play even if the client apparatus 200 does not have sufficient rendering capability.

Additionally, in the game system of the present embodiment, information indicating an operation input made by the user in the client apparatus 200 as first operation information is sent to the server 100 via the network 300. Based on the operation input, the generation control for pre-defined actions within the game, such as character operation and changing of various parameters, is performed in the server 100 in the processing for the game. In the game system of the present embodiment, as for the information indicating the operation input, whether an operation input has been made for any of the actions within the game need not be determined in the client, apparatus 200. The processing for this determination is executed in the server 100. More specifically, the information indicating the operation input is so-called "raw" information that is generated in response to, for example, a bit change resulting from the detection of a control signal generated when an operation input has been made for any of the operation members included in the operation input interface of the client, apparatus 200, and that indicates the operation member. However, the information indicating the operation input is not necessarily unprocessed, raw information. For example, all control signals that are detected within a predetermined period may be transmitted to the server 100 in the form of integrated information indicating the operation input detected within the aforementioned period, either in association with or independent of the detection timing. For example, in the case of information indicating the position (X, Y coordinates) of an analog stick or the like, the values detected by a sensing method may not be stable. Therefore, such information may be processed so as to be converted into a form suitable for the processing for a game, for example, by performing processing for smoothing the detected values by using a low-pass filter or the like.

Configuration of Server 100

Next, the functional configuration of the server 100 of the present embodiment according to this game system will be described with reference to FIG. 2.

A server control unit 101 is, for example, a control device such as a CPU, and controls the operation of various blocks included in the server 100. The server control unit 101 controls the operation of each of the blocks, for example, by reading out the operating program of the block that is stored in a server storage medium 102, and extracting and executing the program in a server memory 103.

The server storage medium 102 may be, for example, a rewritable non-volatile memory or a storage device such as an HDD that is removably connected to the server 100. The server storage medium 102 stores, in addition to the operating programs of the blocks of the server 100, information necessary for the operation of the blocks, such as parameters. In addition, the server storage medium 102 stores game programs corresponding to various types of game content that can be served, and information on the game genre of each type of content. The server memory 103 may be, for example, a storage device such as a DRAM or a volatile memory. The server memory 103 can be used not only as the expansion area for the operating programs of the blocks, but also as a storage area for temporarily storing intermediate data such as a game screen that has been output during the operation of the blocks.

A server rendering unit 104 is, for example, a rendering device such as a GPU. The server rendering unit 104 performs rendering processing for the corresponding game screen in accordance with a rendering command generated as a result of execution of the processing for a game by the server control unit 101. At this time, the data necessary for rendering the game screen, such as model data and texture data, is read out from the server storage medium 102, and is extracted in a GPU memory (not shown). The server rendering unit 104 renders the game screen by applying processing in accordance with the rendering command to the extracted data. Note that although the game system of the present embodiment is described assuming that the server 100 includes the server rendering unit 104, the server rendering unit 104 may be provided in an apparatus that is separate from the server 100. In this case, the provision of the game screen to the client apparatus 200 may be performed by the apparatus that renders the game screen.

A server communication unit 105 is a communication interface included in the server 100. The server communication unit 105 sends data to or receives data from the client apparatus 200 with which communication connection via the network 300 has been established. In the server 100 of the present embodiment, the server communication unit 105 receives, from the client apparatus 200, information (operation information) indicating an operation input made in the client apparatus 200, and sends, to the client apparatus 200, a game screen rendered as a result of the processing for a game. In the present embodiment, the server communication unit 105 transmits the received operation information to an input control unit 110.

The input control unit 110 analyzes the operation information received from the client apparatus 200, converts the operation information into information serving as second operation information indicating the operation input from which it is determined that the action desired by the user has been performed in the processing for a game, and outputs the information to the server control unit 101. Although the details of the operation of the input control unit 110 will be described later, in the present embodiment, the input control unit 110 converts the operation input made in the client apparatus 200, by referring to information (correspondence information) that indicates an operation input method (e.g., the assignment and the input order of operation members) for causing various actions within the game and that is previously set by the user for the genre of the game for which a provision request has been made, for example. The correspondence information is stored in a correspondence information database (PB) 120. The input control unit 110 acquires the correspondence information from the correspondence information DB 120, and executes processing for conversion.

As shown in FIG. 4, in the present embodiment, the correspondence information manages information indicating operation members (user-specified operation members) that is set by the user or the like as a member that accepts an operation input, for each of the actions classified as the same type of category, including, for example, moving or jumping, in different games of the same genre for each game genre. In addition, the correspondence information manages information indicating operation members (game-specified operation members) determined to be things to which an operation input that causes an action of each category has been made in the processing for a game for each of the games of the corresponding genre, in association with the information indicating the user-specified operation members. Note that the information indicating the game-specified operation members may be previously provided as data having a predetermined form by a publisher of the game at the time of providing a service in the cloud game system, for example. Alternatively, the information may be generated by analyzing the game program or by referring to a predetermined setting file.

The actions within the game for which the correspondence with the correspondence information is defined for a single game genre may be selected so as to include at least some of the general actions that are provided to be usable by the user within a game of that genre, for example. More specifically, for a game of the three-dimensional action genre shown in FIG. 4, actions that are provided in common to the games of that genre, namely, "character movement", "camera movement", "forward direction of rotation of camera", "armed attack", "defense", "avoidance", "item selection", "running", "throwing", "aiming", "determination", and "cancellation" are provided. In addition, other actions that are uniquely provided to each game, including, for example, "shortcut key operation" and "special attack", need not be defined in the correspondence information.

Note that for simplicity, the example shown in FIG. 4 only illustrates a single game genre (three-dimensional action game) for the correspondence information associated with a single user. However, it can be easily understood that the correspondence information associated with a single user may similarly include information indicating the correspondence between the user-specified operation members and the game-specified operation members for each game for other game genres. Although the present embodiment describes the correspondence information as being managed on a user-by-user basis, embodiments of the present invention are not limited thereto. More specifically, for example, for a plurality of users who are familiar with the operation input method of a specific game, common correspondence information may be referred to when the users play a game of the same genre as the genre of that game. Alternatively, the correspondence information may be configured and managed such that same correspondence information is used for a plurality of users who are common in predetermined aspects with regard to the user or the user environment, including, for example, the operation input interface used for game play, the specifications of the client apparatus, the display device or the country of origin of the playing user, the dominant hand, and the level of operational proficiency.

Although the present embodiment describes a functional configuration in which the input control unit 110 and the correspondence information DB 120 are provided in the server 100, implementations of the present invention are not limited thereto. More specifically, each of the input control unit 110 and the correspondence information DB 120 may be configured as a device separate from the server 100, or may be configured, for example, as a dedicated application installed in the client apparatus 200, or a dedicated device connected to the client apparatus 200. In this case, the input control unit 110 may accept the operation information from its own input interface, acquire the correspondence information from the correspondence information DB 120, and output the operation information that has been converted based on the correspondence information to the server 100. As is evident from the foregoing, it can be understood that the input control unit 110 and the correspondence information DB 120 need not be installed in the same apparatus.

Configuration of Client Apparatus 200

Figure 3:
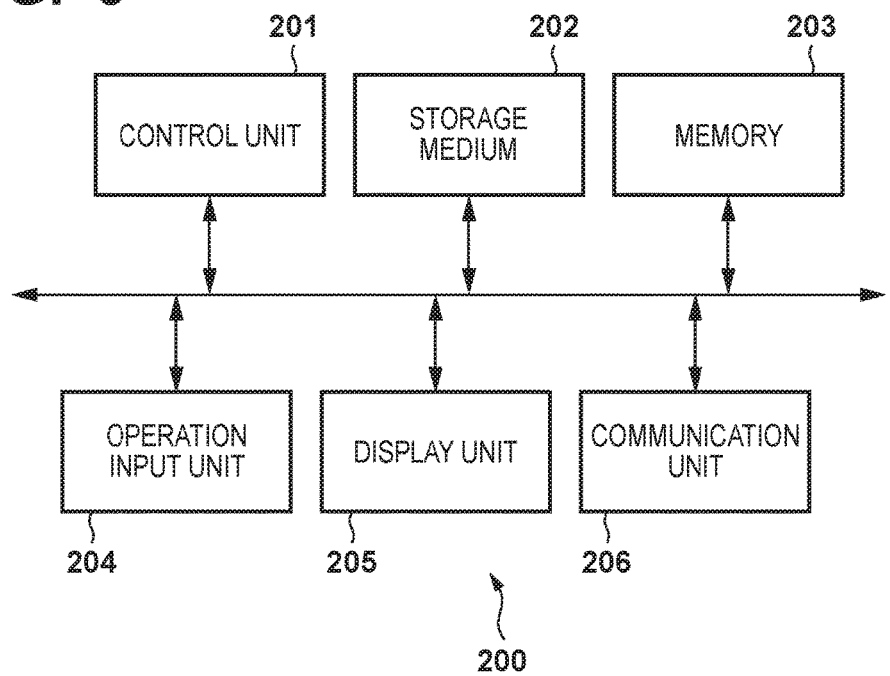
FIG. 3 is a diagram illustrating a functional configuration of a client apparatus 200 according to embodiments and variations of the present invention.

Next, the functional configuration of the client apparatus 200 of the game system according to the present embodiment will be described with reference to FIG. 3.

A control unit 201 is, for example, a control device such as a CPU, and controls the operation of various blocks included in the client apparatus 200. The control unit 201 controls the operation of each of the blocks, for example, by reading out the operating program of the block that is stored in a storage medium 202, and extracting and executing the program in a memory 203.

The storage medium 202 may be, for example, a rewritable non-volatile memory or a storage device such as an HDD that is removably connected to the client apparatus 200. The storage medium 202 stores, in addition to the operating programs of the blocks of the client apparatus 200, information necessary for the operation of the blocks, such as parameters. In addition, the storage medium 202 stores data on application for receiving the provision of service for game play in the game system. The application may be, for example, a general-purpose application such as a Web browser, or may be a dedicated application supplied for the provision of service. The memory 203 may be, for example, a storage device such as a DRAM or a volatile memory. The memory 203 can be used not only as the expansion area for the operating programs of the blocks, but also as a storage area for temporarily storing intermediate data that is output during the operation of the blocks.

An operation input unit 204 is, for example, a user interface included in the client apparatus 200, and is configured to include a predetermined operation member such as a mouse, a keyboard, a gamepad, a joystick, or a touch panel. Upon detection of an operation input made to a user interface that is provided in the client apparatus 200 or is connected in an extended manner, the operation input unit 204 outputs the corresponding control signal to the control unit 201.

A display unit 205 is, for example, a display device such as an LCD that displays the game screen received from the server 100. The display unit 205 may be contained in the casing of the client apparatus 200, or may be removably connected to the outside of the client apparatus 200.

A communication unit 206 is a communication interface included in the client apparatus 200. The communication unit 206 exchanges data with the server 100 with which communication connection via the network 300 has been established. In the client, apparatus 200 of the present embodiment, the communication unit 206 sends, to the server 100, the operation information generated by the control unit 201 based on the control signal corresponding to the operation input output from the operation input unit 204, and receives a game screen rendered as a result of the processing for a game in the server 100.

Game Processing

Figure 5:
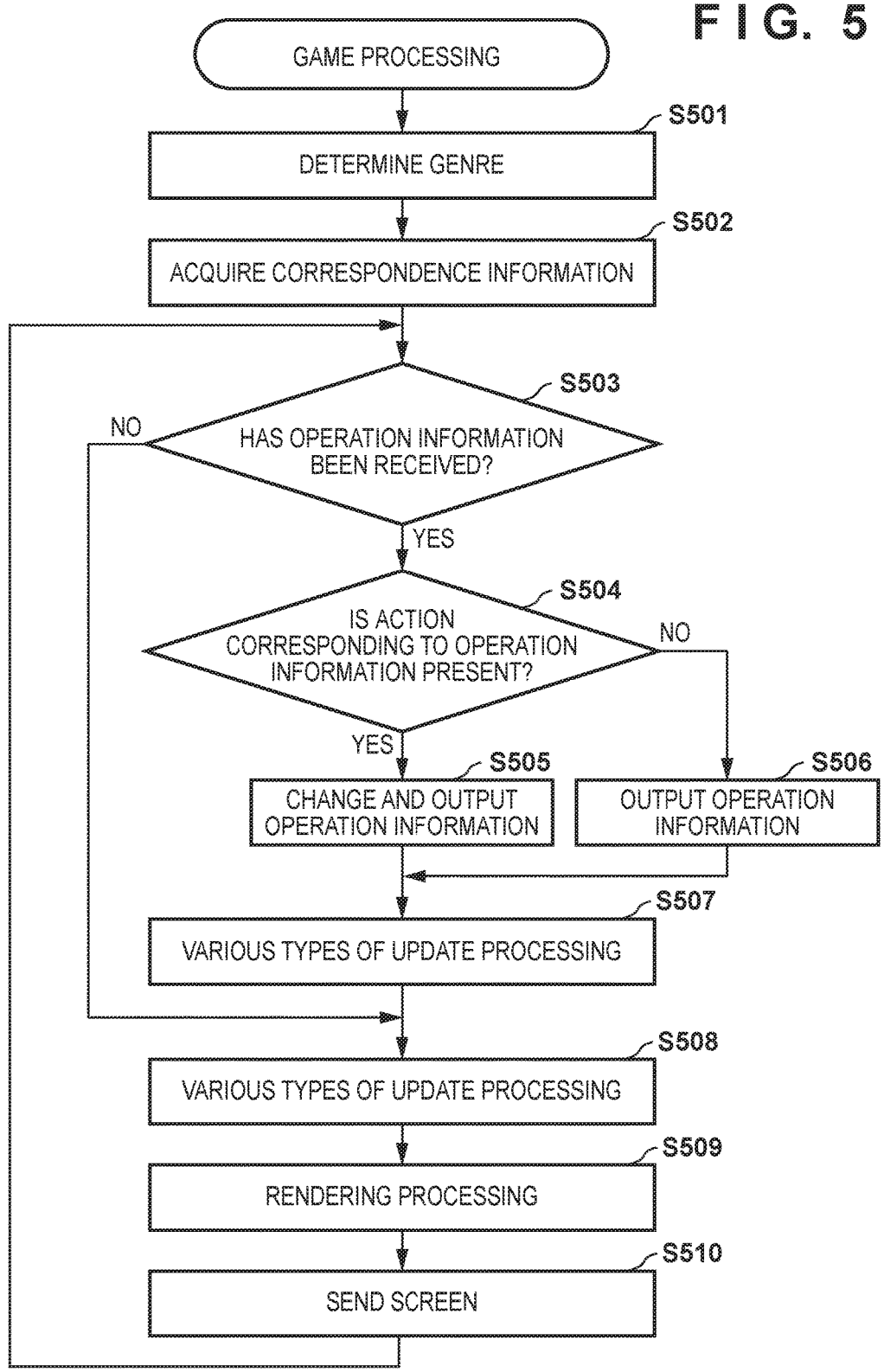
FIG. 5 is a flowchart illustrating game processing executed in the server 100 according to Embodiment 1 of the present invention.

Specific processing for the game processing executed in the server 100 when the user uses a service in the game system of the present embodiment having this configuration will be described with reference to the flowchart in FIG. 5. The processing corresponding to the flowchart can be implemented, for example, by the server control unit 101 reading out the corresponding processing program stored in the server storage medium 102, and extracting and executing the program in the server memory 103. Note that the game processing of the present embodiment will be described assuming that the game processing is started upon receiving a provision request for the game screen from the client apparatus 200 (target client). The provision request includes, for example, the selection of the game that is played by the user who wishes to use the service.

At S501, the server control unit 101 determines the game genre to which the game (content) for which the provision request has been made belongs. Based on the identification information (game ID) of the game for which the provision request has been made, the server control unit 101 acquires the identification information (genre ID) of the game genre associated with the identification information from the information on the game genre of each content stored in the server storage medium 102. The server control unit 101 transmits the acquired genre ID and game ID, and user ID indicating the user of the target client to the input control unit 110.

At S502, the input control unit 110 acquires, from among the correspondence information associated with the user ID, the correspondence information corresponding to the acquired genre ID from the correspondence information DB 120, and stores the information in a RAM (not shown). The game processing of the present embodiment is described assuming that the correspondence information for the user of the target client is previously stored in the correspondence information DB 120. However, when this correspondence information is not present, the input control unit 110 does not acquire the correspondence information in this step. In this case, the input control unit 110 may output the operation information for the game that has been received from the target client as is to the server control unit 101.

At S503, the input control unit 110 determines whether the server communication unit 105 has received the operation information for the game from the target client. If it is determined that the operation information has been received from the target client, the input control unit 110 moves the processing to S504. If it is determined that the operation information has not been received, the input control unit 110 moves the processing to S508.

At 3504, the input control unit 110 analyzes the received operation information, and acquires the information on first operation members to which an operation input has been made in the target client. Then, the input control unit 110 compares the acquired information on the first operation members and the information on the user specified operation member that is included in the correspondence information, and determines whether the action corresponding to the operation information is present. If it is determined that the action corresponding to the operation information is present, the input control unit 110 moves the processing to S505. If it is determined that the action is not present, the input control unit 110 moves the processing to S506.

At S505, the input control unit 110 acquires information on the game-specified operation members that cause the action in the processing for the game for which the provision request has been made, for the action corresponding to the operation information. More specifically, the input control unit 110 acquires, from the correspondence information, information on the game-specified operation members managed for the action corresponding to the operation information in relation to the game ID of the game that is played. Then, the input control unit 110 changes the operation information based on the acquired information on the game-specified operation members. That is, the input control unit 110 changes the operation information so as to indicate that the operation input to the game-specified operation members has been made, and outputs the changed information to the server control unit 101.

For example, when the information on the first operation members that is indicated by the received operation information is "analog stick L (Left)+x", the input control unit 110 determines that the action corresponding to the operation information is "avoidance" in the correspondence information in FIG. 4. At this time, if the game ID of the game for which the provision request has been made is "B", the corresponding game-specified operation members are "analog stick L+Δ+o" denoted by item 401. Accordingly, the input control unit 110 changes the operation information to information indicating an operation input has been made for the operation members indicated by the item 401.

On the other hand, if it is determined at S504 that the action corresponding to the operation information is not present, the input control unit 110 outputs the operation information received at S506 as is to the server control unit 101.

At S507, the server control unit 101 executes various types of event processing based on the operation information output from the input control unit 110, and performs processing such as updating of various parameters based on the operation input.

At S508, the server control unit 101 performs processing independent of the operation input, including, for example, updating of various parameters for change over time or the like.

At S509, based on the updated parameters, the server control unit 101 transmits a rendering command for the game screen to the server rendering unit 104, and causes the server rendering unit 104 to execute the rendering processing for the game screen. Then, at S510, the server control unit 101 transmits the game screen rendered by the server rendering unit 104 to the server communication unit 105, causes the server communication unit 105 to send the game screen to the target client, returns the processing to S503, and performs the processing for the subsequent frame.

By doing so, the game system of the present embodiment enables the user to use a common operation input method during game play of the same genre, based on the previously set correspondence information.

Correspondence Information Update Processing

Figure 6:
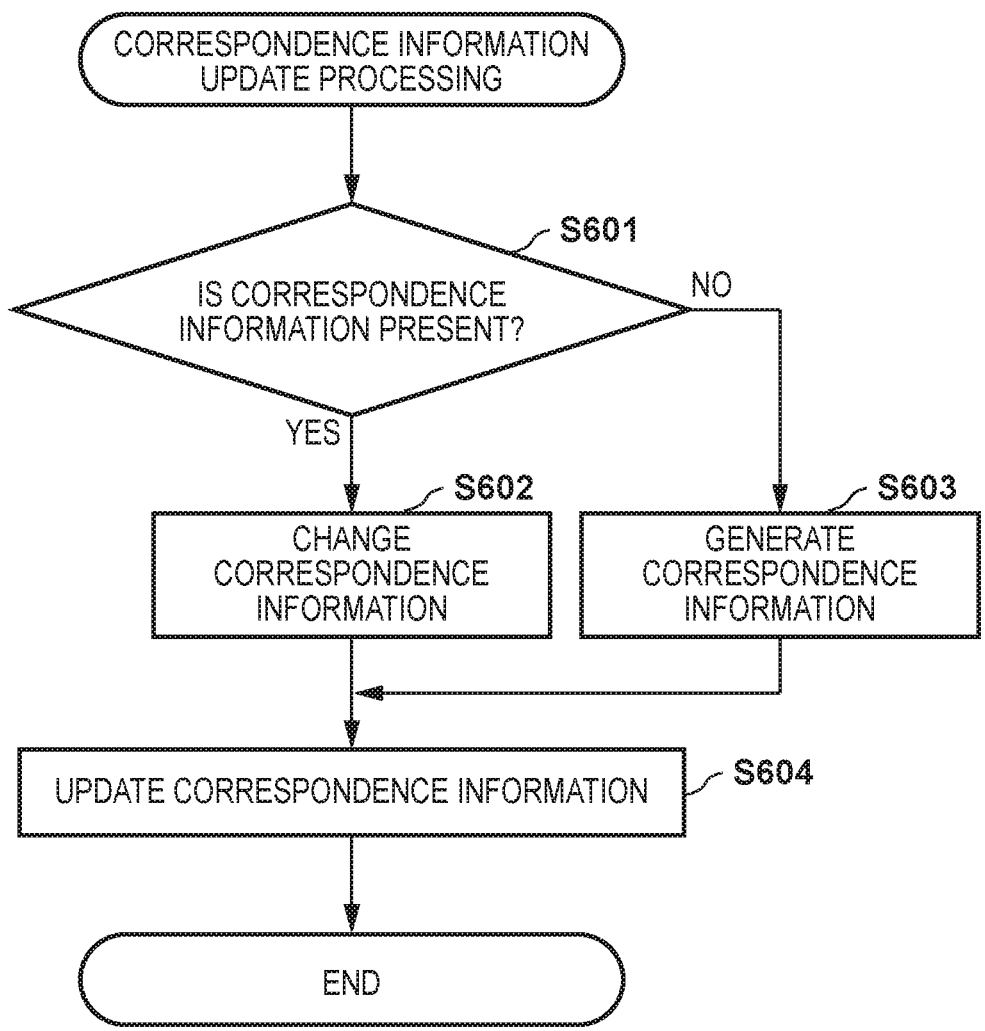
FIG. 6 is a flowchart illustrating correspondence information update processing executed by an input control unit 110 according to Embodiment 1 of the present invention.

Next, with reference to the flowchart in FIG. 6, a description will be given of specific processing of correspondence information update processing executed by the input control unit 110 in order to change the correspondence information for a game of a predetermined genre based on a user instruction in the game system of the present embodiment.

The processing corresponding to the flowchart may be implemented by the server control unit 101 reading out, for example, the corresponding processing program stored in the server storage medium 102, and extracting and executing the program in the server memory 103. When the input control unit 110 is provided as a stand-alone device, the processing may be implemented by the input control unit 110 reading out the processing program stored in a ROM (not shown), and extracting and executing the program in the RAM.

Note that the correspondence information update processing of the present embodiment is described as being started when an operation to set the operation input method for the game being played has been set by the user who is using the service and the input control unit 110 has detected that the server communication unit 105 has received information indicating the settings (setting information) from the target client. In addition, the present embodiment is described assuming that the correspondence information update processing is executed during game play, or in other words, during execution of the above-described game processing. Thus, the following description of the processing is given assuming that the input control unit 110 has already acquired the user ID of the currently playing user (user of the target client), the game ID of the game currently being played, and the genre ID for that game. The setting information may be configured to be generated, for example, by executing a function for setting at least operation members used to cause a pre-defined action that is provided in a dedicated application or the like executed by the control unit 201 for the use of the service in the target client, and that can be defined "for the genre" of the game being played.

At S601, the input control unit 110 determines whether the correspondence information for the genre of the game being played and which is associated with the user ID of the user who is currently playing is stored in the correspondence information DB 120. If it is determined that the correspondence information is stored, the input control unit 110 moves the processing to S602. If it is determined that the information is not stored, the input control unit 110 moves the processing to S603. Note that the processing at this step may be omitted when the relevant correspondence information has already been acquired from the correspondence information DB 120 by executing the game processing, and the input control unit 110 may start the processing from S602.

At S602, the input control unit 110 analyzes the received setting information, and determines the action for which the operation members for causing the action have been set. Then, the input control unit 110 changes the information on the user-specified operation members for the corresponding action defined in the correspondence information to the information on the operation members that is set by the user and is included in the setting information.

On the other hand, if it is determined at S601 that the correspondence information for the genre of the game being played is not stored in the correspondence information DB 120, the input control unit 110 newly generates correspondence information for that genre at S603. First, the input control unit 110 acquires the information on the actions within the game that are defined in the correspondence information for the genre, or in other words, information on the actions that may be generally used within the games of the genre. The information on the actions within the game that are defined in the correspondence information may be stored, for example, in the server storage medium 102 or the correspondence information DB 120, or may be stored in a ROM or the like included in the input control unit 110 itself.

Alternatively, the information on the actions within the game that are defined in the correspondence information may be information that is included in advance in the data on the dedicated application executed by the control unit 201 in the target client and that can be acquired by the input control unit 110 by receiving the setting information. Then, the input control unit 110 associates the information on the operation member that is included in the setting information and is set by the user with the acquired corresponding actions within the game to generate information on the user-specified operation member. Additionally, the input control unit 110 acquires the information on the game-specified operation members for each of the games belonging to the same genre as the genre of the game being played, and that can be provided to the target client in the game system of the present embodiment, for example, and associates the acquired information with the various actions to generate correspondence information.

At S604, the input control unit 110 transmits the correspondence information generated at S602 or S603 to the correspondence information DB 120, and stores the information therein in association with the user ID of the target client, thereby updating the correspondence information.

By doing so, the game system of the present embodiment makes it possible to configure the operation input method that is set by the user for a predetermined game such that the method can be used during playing of the games of a common genre that can be provided by the system.

Note that although the present embodiment has been described assuming that the operation members used for the operation input for various actions can be specified by the user, implementations of the present invention are not limited thereto. For example, it is possible to adopt a configuration in which a plurality of patterns of presets in which the operation members used for the operation input of various actions are defined are previously provided, the preset that the user will wish to use is predicted by the input control unit 110 serving as a dedicated application or the input control unit 110 serving as the functional configuration of a predetermined apparatus, based on the frequency or the history of game play of the user, and the correspondence information is updated.

As described above, the information processing apparatus of the present embodiment can simplify the operation input for the actions desired by the user in game play. The information processing apparatus acquires information indicating a genre of a game for which processing is executed, and acquires correspondence information indicating correspondence between information on first operation members that are pre-defined to accept an operation input for an action provided for a game of the same genre as the aforementioned genre and information on second operation members that are predefined to accept an operation input for the action in the processing for the game. Upon receiving first operation information indicating the first operation members to which an operation input has been made, the apparatus changes, based on the correspondence information, the first operation information to second operation information indicating the second operation members associated with the first operation members indicated by the first operation information and outputs the second operation information to the processing for the game.

By doing so, when the correspondence information is provided for a predetermined genre, the user can use an operation input method in common for games of the same genre, and the user can play games provided by different developers by using an operation input method to which the user is accustomed, for example. In other words, the user can easily have a game experience without mastering a new operation input method in accordance with a game.

Embodiment 2

Embodiment 1 above has described a mode that enables the user to use an operation input method in common for a plurality of games of the same genre by the input control unit 110 changing the input operation information based on the correspondence information.

Meanwhile, some conventional games are provided with the function for setting the operation members used for the operation input within the games, or in other words, as an aspect of the processing for a game. In this case, the user can perform setting, for example, for determining to which operation members such as a keyboard the occurrence of the action is assigned for each of the actions that can be caused within the game by the operation input. That is, in such a game, the user can experience a game developed by any developer with the same action by setting the key arrangement to which the user is accustomed for various actions within the game.

However, in fact, such change of the key arrangement requires the user to perform the setting, for example, before the start of the game while trying to remember the key arrangement to which the user is accustomed, thus forcing a complicated operation upon the user. In this respect, there are some games that are provided with a plurality of patterns of key arrangements as selectable presets. However, in actuality, the user needs to check whether the key arrangement set as the preset is the desired one for all the key arrangements, and as a result, there is the possibility that a complicated operation may be forced upon the user.

In the present embodiment, a description will be given of an example in which the present invention is applied in a modern which game content that has already included the function for setting the operation members used for the operation input is used by the user of the client apparatus 200 in the cloud game system as in that of Embodiment 1. Note that the system configuration of the present embodiment and the functional configuration of the server 100 and the client apparatus 200 are the same as those of Embodiment 1 except for the function of the input control unit 110, and the description of the rest of the configuration has been omitted.

Configuration of Input Control Unit 110

In the game system of the present embodiment, the input control unit 110 functions not as a component that changes the received operation information based on the correspondence information, but as a component that prompts the processing for a game for which a provision request has been made from the client apparatus 200 to set the operation input method based on the correspondence information. More specifically, when the correspondence information for the genre of a game that is used that is associated with the user who uses the service is present in the correspondence information DB 120, the input control unit 110 in the present embodiment performs the setting of the operation input method in the game on behalf of the user by referring to the correspondence information.

Input Method Setting Processing

Specific processing for input method setting processing executed in the server 100 to reflect the operation input method based on the correspondence information in the setting of the game processing when the user starts the use of the service in the game system of the present embodiment will be described below with reference to the flowchart in FIG. 7. The processing corresponding to the flowchart may be implemented, for example, by the server control unit 101 reading out the corresponding processing program stored in the server storage medium 102, and extracting and executing the program in the server memory 103. Alternatively, when the input control unit 110 is provided as a stand-alone device, the processing may be executed by the input control unit 110 reading out the processing program stored in a ROM (not shown), and extracting and executing the program in the RAM.

Note that the input method setting processing in the present embodiment is described as being started, for example, when game processing that is executed in correspondence therewith has proceeded to a state in which the setting of the operation input method can be changed after receiving a provision request for the start of the use of the service from the target client. However, the start of this processing is not limited thereto, and the processing may be started, for example, when a request for using a similar operation input method as another game of the same genre is received from the user for the game being played.

At S701, the input control unit 110 acquires a genre ID indicating the game genre to which the game for which the provision request has been made belongs, and a user ID indicating the user of the target client. The genre ID and the user ID may be supplied to the input control unit 110 by the server control unit 101 as with the game processing of Embodiment 1, or may be configured to be acquired by the input control unit 110 by monitoring or concurrently receiving the operation information received by the server communication unit 105.

At S702, the input control unit 110 determines whether the correspondence information corresponding to the acquired genre ID, from among the correspondence information associated with the user ID, is managed in the correspondence information DB 120. If it is determined that the relevant, correspondence information (target correspondence information) is managed in the correspondence information DB 120, the input control unit 110 moves the processing to S703. If it is determined that the target correspondence information is not managed, the input control unit 110 ends the input method setting processing.

At S703, the input control unit 110 acquires the target correspondence information from the correspondence information PB 120, and stores the acquired information in a RAM (not shown). Then, at S704, the input control unit 110 reads out the information on the user-specified operation members from the target correspondence information as the information on the operation members for which a determination is made in the game processing that an operation input has been made for the actions defined in the correspondence information, and transmits the information together with a setting change request to the server control unit 101.

In the present embodiment, the setting change of the operation input method is described as being executed by the server control unit 101 as processing within a game by transmitting the setting change request. However, implementations of the present invention are not limited thereto. For example, when the information indicating the operation members for causing various actions within a game is managed by data, such as parameters, that is extracted in the server memory 103 that can be accessed by the input control unit 110 as in the present embodiment, the input control unit 110 may directly change the data based on the information on the user-specified operation member. In that case, the input control unit 110 may acquire the game ID, determine the data on the server memory 103 by referring to the information on the corresponding came-specified operation members for each action, and change the data based on the associated user-specified operation members information.

Note that when the setting of the operation members that accept the operation input for causing an action within the game is reflected in the processing for the game as in the present embodiment, the operation information that is received by the server communication unit 105 from the target client in relation to the game operation during game play may be transmitted directly to the server control unit 101. In this case, configuration may be taken such that only the processing at S503, S507, S508, S509, and S510 is performed in the game processing of Embodiment 1. In addition, the correspondence information update processing described above in Embodiment 1 may be configured to be also executable in the game system of the present embodiment, thereby causing the correspondence information DB 120 to hold the correspondence information desired by the user, for example, and causing that corresponding information to be reflected during game play.

As described above, the information processing apparatus of the present embodiment can simplify the operation input for the operations desired by the user in game play. The information processing apparatus acquires information indicating a genre of a game for which processing is executed, and acquires correspondence information indicating correspondence between information on first operation members that are pre-defined to accept an operation input for an action provided for a game of the same genre as the aforementioned genre and information on second operation members that are predefined to accept an operation input for the action in the executed processing for the game. The apparatus changes the setting of the processing for the executed game such that an action based on an operation input accepted by the second operation members is accepted by an operation input to the first operation members associated with the action in the acquired correspondence information.

By doing so, the game system of the present embodiment enables the user to use a common operation input method during game play of games of the same genre, based on the previously set correspondence information, as with Embodiment 1.

Variation 1

Although Embodiments 1 and 2 above have been described assuming that the information on the user-specified operation members assigned to various actions in the correspondence information for each game genre and the information on the game-specified operation members are managed in association with each other, implementations of the present invention are not limited thereto. For example, for actions, such as "determination", "cancellation", and "displaying menu", that are used within a game regardless of the genre, other correspondence information serving as common correspondence information of the present invention that is managed independent of the genre may be stored in the correspondence information DB 120.

Variation 2

Although Embodiments 1 and 2 and Variation 1 have been described assuming that the operation members used for the operation input are defined in the correspondence information for each action, implementations of the present invention are not limited thereto. The correspondence information may manage, for example, a control signal that is input, an address of an I/O bit that is changed, or an input detection event that occurs when an operation input has been made for the operation members.

Variation 3

Since it is conceivable that various models of client apparatuses can be used as the client apparatus 200 that uses the cloud game system as described above, the correspondence information may be provided for each model type or each operation input interface used. More specifically, significantly different operation input methods are used for, for example, an operation input interface such as a smartphone that uses a touch input interface as a main operation member and an operation input interface such as a keyboard. Accordingly, these operation input methods cannot be controlled by a single piece of correspondence information for the same user ID. Therefore, the correspondence information may be managed for each configuration of the operation members included in the operation input interface.

Variation 4

Although the above embodiments and variations have been described assuming that the present invention is applied to the cloud game system as shown in FIG. 1, it can be easily understood that embodiments of the present invention are not limited thereto. More specifically, the present invention is also applicable to a stand-alone game console and an information terminal that do not communicate with a server. As long as the information on the genre of game content that is used can be obtained, it is possible to achieve a configuration in which the correspondence information is managed in the above-described manner, thus enabling an operation input method to be used in common for the same game.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the information processing apparatus and the controlling method thereof according to the present invention are realizable by a program executing the methods on a computer. The program is providable/distributable by being stored on a computer-readable storage medium or through an electronic communication line.

The invention claimed is:

1. A non-transitory computer readable recording medium which records a program that causes a computer connected to a processor which is able to execute processing for a game to execute processes comprising:
   acquiring information indicating a genre of a first game for which processing is executed by the processor;
   acquiring correspondence information indicating a correspondence between information on a first operation member that is pre-defined to accept an operation input for an action provided for a second game of a same genre as a genre of the first game for which the processing is executed and information on a second operation member that is pre-defined to accept an operation input for the action in the executed processing for the first game;
   receiving first operation information indicating the first operation member to which an operation input has been made; and changing, based on the correspondence information, the first operation information to second operation information indicating the second operation member associated with the first operation member indicated by the first operation information and outputting the second operation information to the processor, wherein a common user interface, which includes the first operation member and the second operation member, is used for both of the first game and the second game, and different operation members are pre-defined between at least a part of common actions provided for the first game and the second game.

2. The recording medium according to claim 1, wherein, in a case where the correspondence information cannot be acquired, the first operation information is output to the processor, without changing the first operation information.

3. The recording medium according to claim 1, wherein, even where the correspondence information cannot be acquired, in a case where common correspondence information indicating a correspondence between the information on the first operation member and the information on the second operation member for a common action that is irrespective of the genre of the first game can be acquired, the first operation information for the common action is changed to the second operation information based on the common correspondence information, and the second operation information is output to the processor.

4. A non-transitory computer readable recording medium which records a program that causes a computer connected to a processor which is able to execute processing for a game to execute processes comprising:

acquiring information indicating a genre of a first game for which processing is executed by the processor;

acquiring correspondence information indicating a correspondence between information on a first operation member that is pre-defined to accept an operation input for an action provided for a second game of a same genre as a genre of the first game for which the processing is executed and information on a second operation member that is pre-defined to accept an operation input for the action in the executed processing for the first game; and causing the processor to change a setting of the executed processing for the first game such that an action based on an operation input accepted by the second operation member is accepted as an operation input to the first operation member associated with the action in the correspondence information, wherein a common user interface, which includes the first operation member and the second operation member, is used for both of the first game and the second game, and different operation members are pre-defined between at least a part of common actions provided for the first game and the second game.

5. The recording medium according to claim 4, wherein the causing of the processor to change the setting is not executed in a case where the correspondence information cannot be acquired.

6. The recording medium according to claim 4, wherein, even where the correspondence information cannot be acquired, in a case where common correspondence information indicating correspondence between the information on the first operation member and the information on the second operation member for a common action that is irrespective of the genre of the first game can be acquired, the processor is caused to change the setting of the executed processing for the first game such that an operation input is accepted by the first operation member associated with the common operation.

7. The recording medium according to claim 1, wherein the program further causing the computer to execute:

detecting that a setting of the first operation member has been performed for the executed processing for the first game; and causing, in a case where the setting of the first operation member has been performed, the is updated based on the setting.

8. The recording medium according to claim 7, wherein the correspondence information is information that associates the information on the first operation member with the information on the second operation member for each category of actions, and updating of the correspondence information includes associating the information on the second operation member, that belongs to a category of an action for which the setting of the first operation member has been performed, with the information on the first operation member.

9. The recording medium according to claim 1, wherein the correspondence information is information managed for each user who plays the first game for which the processing is executed, and the correspondence information is acquired based on information for identifying a user who plays the first game for which the processing is executed.

10. The recording medium according to claim 1, wherein the computer and the processor are connected via a network.

11. An information processing apparatus connected to a first processor which is able to execute processing for a game, the information processing apparatus comprising:

a second processor; and a memory including instructions that, when executed by the second processor, cause the second processor to perform operations including:

acquiring information indicating a genre of a first game for which processing is executed by the first processor;

acquiring correspondence information indicating a correspondence between information on a first operation member that is pre-defined to accept an operation input for an action provided for a second game of a same genre as a genre of the first game and information on a second operation member that is pre-defined to accept an operation input for the action in the executed processing for the first game;

receiving first operation information indicating the first operation member to which an operation input has been made; and changing, based on the correspondence information, the first operation information to second operation information indicating the second operation member associated with the first operation member indicated by the first operation information and outputting the second operation information to the first processor, wherein a common user interface, which includes the first operation member and the second operation member, is used for both of the first game and the second game, and different operation members are pre-defined between at least a part of common actions provided for the first game and the second game.

12. An information processing apparatus connected to a a first processor which is able to execute processing for a game, the information processing apparatus comprising:
    a second processor; and
    a memory including instructions that, when executed by the second processor, cause the second processor to perform operations including:
        acquiring information indicating a genre of a first game for which processing is executed by the first processor;
        acquiring correspondence information indicating a correspondence between information on a first operation member that is pre-defined to accept an operation input for an action provided for a second game of a same genre as a genre of the first game and information on a second operation member that is pre-defined to accept an operation input for the action in the executed processing for the first game; and
        causing the first processor to change a setting of the executed processing for the game such that an action based on an operation input accepted by the second operation member, is accepted as an operation input to the first operation member associated with the action in the correspondence information,
    wherein a common user interface, which includes the first operation member and the second operation member, is used for both of the first game and the second game, and
    different operation members are pre-defined between at least a part of common actions provided for the first game and the second game.

13. A control method for an information processing apparatus connected to a first processor which is able to execute processing for a game, the control method comprising:
    acquiring, by a second processor, information indicating a genre of a first game for which processing is executed by the first processor;
    acquiring, by the second processor, correspondence information indicating a correspondence between information on a first operation member that is pre-defined to accept an operation input for an action provided for a second game of a same genre as a genre of the first game and information on a second operation member that is pre-defined to accept an operation input for the action in the executed processing for the first game;
    receiving, by the second processor, first operation information indicating the first operation member to which an operation input has been made; and
    changing, by the second processor and based on the correspondence information acquired by the second processor, the first operation information to second operation information indicating the second operation member associated with the first operation member indicated by the first operation information and outputting the second operation information to the first processor,
    wherein a common user interface, which includes the first operation member and the second operation member, is used for both of the first game and the second game, and
    different operation members are pre-defined between at least a part of common actions provided for the first game and the second game.

14. A control method for an information processing apparatus connected to a first processor which is able to execute processing for a game, the control method comprising:
    acquiring, by a second processor, information indicating a genre of a first game for which processing is executed by the first processor;
    acquiring, by the second processor, correspondence information indicating a correspondence between information on a first operation member that is pre-defined to accept an operation input for an action provided for a second game of a same genre as a genre of the first game and information on a second operation member that is pre-defined to accept an operation input for the action in the executed processing for the first game; and
    causing the first processor to change a setting of the executed processing for the first game such that an action based on an operation input accepted by the second operation member is accepted by an operation input to the first operation member associated with the action in the correspondence information,
    wherein a common user interface, which includes the first operation member and the second operation member, is used for both of the first game and the second game, and
    different operation members are pre-defined between at least a part of common actions provided for the first game and the second game.

* * * * *